H. THACKER.
Rake and Hoe.
No. 84,231.          Patented Nov. 17, 1868.
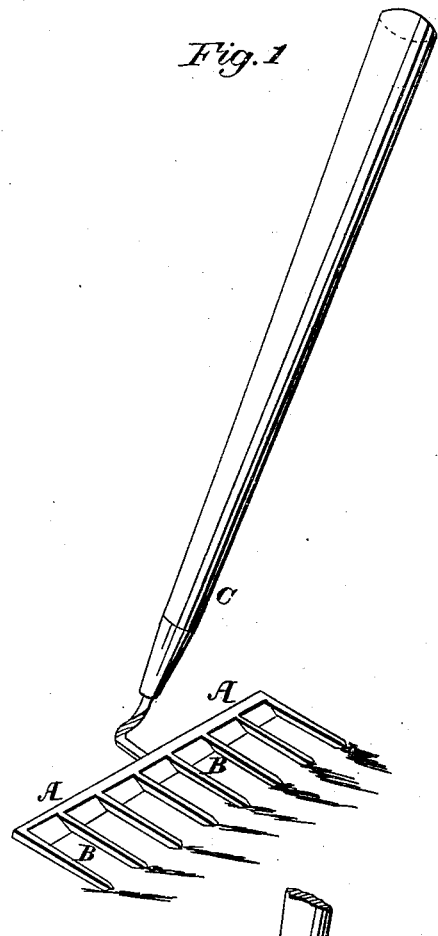
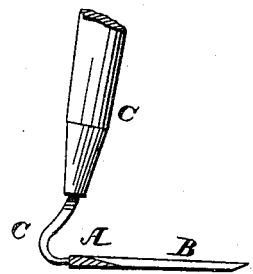
WITNESSES:
INVENTOR:
H. Thacker

HENRY THACKER, OF ONEIDA, NEW YORK.

Letters Patent No. 84,231, dated November 17, 1868.

IMPROVEMENT IN COMBINED RAKE AND HOE.

The Schedule referred to in these Letters Patent and making part of the same.

*To all whom it may concern:*

Be it known that I, HENRY THACKER, of Oneida, in the county of Madison, and State of New York, have invented a new Combined Rake and Hoe; and I do hereby declare that the following is a full, clear, and exact description thereof, which will enable others skilled in the art to make and use the same, reference being had to the accompanying drawings, forming part of this specification, in which—

Figure 1 represents a perspective view of my combined rake and hoe.

Figure 2 is a detail transverse section of the same.

Similar letters of reference indicate like parts.

The object of this invention is to produce an agricultural implement which will at once be a hoe and a rake, and which can be used as such without requiring any adjustment or change of parts.

The invention consists in forming a cutting-edge on the cross-head of the rake, so that such cross-head will constitute a hoe.

This is a very simple and practicable method of combining the hoe and rake in one implement, whereby the instrument can be used for pulverizing and breaking the soil, for cutting weeds, and depositing them in any desired place, so as to leave the ground in a smooth and level condition, all with one single stroke of the instrument.

A represents the cross-head of a rake, from which the tines B B project, in the ordinary or in a suitable manner.

The cross-head is attached to the handle C, in any suitable manner, and the handle is of suitable construction.

The lower edge of the cross-head A is sharpened, so as to form a cutting-edge between the tines, as is clearly illustrated in the drawing.

It will be easily understood that by drawing this tool over the ground, it will at once cut and rake the same.

I am aware that rakes have been made having a serrated or tooth-plate attached to the head, with the teeth projecting between the tines; but these are not adapted for hoeing-purposes, as the construction of the teeth permits the passage of dirt between them.

Having described my invention,

What I claim as new, and desire to secure by Letters Patent, is—

As a new article of manufacture, the combined rake and hoe, cast in one piece, the cross-head A being sharpened between the tines B, to form a straight cutting-edge, as herein described, for the purpose specified.

HENRY THACKER.

Witnesses:
E. H. HAMILTON,
C. A. CRAGIN.